(12) United States Patent
Kumeno et al.

(10) Patent No.: US 10,157,468 B2
(45) Date of Patent: Dec. 18, 2018

(54) OBJECT DETECTION DEVICE, OBJECT DETECTION METHOD, AND OBJECT DETECTION SYSTEM

(71) Applicants: NEC Corporation, Tokyo (JP); National University Corporation Hokkaido University, Hokkaido (JP); Flowbiz Research INC., Tokyo (JP)

(72) Inventors: Hiroyuki Kumeno, Tokyo (JP); Yuichi Murai, Hokkaido (JP); Yasushi Takeda, Tokyo (JP)

(73) Assignees: NEC Corporation, Tokyo (JP); National Univ. Corporation Hokkaido Univ., Hokkaido (JP); Flowbiz Research Inc., Tokyo (JP)

( * ) Notice: Subject to any disclaimer, the term of this patent is extended or adjusted under 35 U.S.C. 154(b) by 0 days.

(21) Appl. No.: 15/308,753

(22) PCT Filed: Apr. 30, 2015

(86) PCT No.: PCT/JP2015/063535
§ 371 (c)(1),
(2) Date: Nov. 3, 2016

(87) PCT Pub. No.: WO2015/170776
PCT Pub. Date: Nov. 12, 2015

(65) Prior Publication Data
US 2017/0186175 A1    Jun. 29, 2017

(30) Foreign Application Priority Data
May 7, 2014    (JP) .................................. 2014-095815

(51) Int. Cl.
*G06T 7/20* (2017.01)
*G06T 7/194* (2017.01)
(Continued)

(52) U.S. Cl.
CPC .............. *G06T 7/20* (2013.01); *G01S 3/7865* (2013.01); *G06K 9/00335* (2013.01);
(Continued)

(58) Field of Classification Search
CPC .............. G06T 7/20; G06T 7/194; G06T 7/11
See application file for complete search history.

(56) References Cited

U.S. PATENT DOCUMENTS 8,139,858 B1    3/2012    Landwehr et al.
8,570,211 B1    10/2013    Piesinger
(Continued)

FOREIGN PATENT DOCUMENTS

CN    1612165 A    5/2005
CN    101694681 A    4/2010
(Continued)

OTHER PUBLICATIONS

International Search Report corresponding to PCT/JP2015/063535, 1 page, dated Jul. 28, 2015.
(Continued)

*Primary Examiner* — Jeffery A Williams
(74) *Attorney, Agent, or Firm* — Wilmer Cutler Pickering Hale and Dorr LLP (57) ABSTRACT

An object detection device of an object detection system includes an object detection determination unit including a bird candidate determination unit for determining, from an image acquired by imaging a moving object, whether or not the moving object is a specific detection subject (bird in this case), and a bird type/attitude estimation unit for estimating, based on a contour of the moving object determined to be the bird by the bird candidate determination unit and a WFM library storing contour shape information, which is a contour prepared for each of types of the specific detection subject
(Continued)

(types of the bird in this case), a type of the moving object out of the types of the specific detection subject.

10 Claims, 5 Drawing Sheets (51) Int. Cl.

| | |
|---|---|
| G06T 7/11 | (2017.01) |
| G06T 7/60 | (2017.01) |
| G06T 7/246 | (2017.01) |
| G01S 3/786 | (2006.01) |
| G06K 9/00 | (2006.01) |
| G06K 9/62 | (2006.01) |
| G06K 9/78 | (2006.01) |
| G06K 9/48 | (2006.01) |

(52) U.S. Cl.
CPC ..... *G06K 9/00362* (2013.01); *G06K 9/00624* (2013.01); *G06K 9/48* (2013.01); *G06K 9/6204* (2013.01); *G06K 9/6212* (2013.01); *G06K 9/78* (2013.01); *G06T 7/11* (2017.01); *G06T 7/194* (2017.01); *G06T 7/246* (2017.01); *G06T 7/248* (2017.01); *G06T 7/60* (2013.01)

(56) References Cited

U.S. PATENT DOCUMENTS

| | | | |
|---|---|---|---|
| 8,693,778 B1 | 4/2014 | Landwehr et al. | |
| 8,704,668 B1 | 4/2014 | Darrell et al. | |
| 2003/0190076 A1 | 10/2003 | DeLean | |
| 2005/0025357 A1 | 2/2005 | Landwehr et al. | |
| 2008/0298962 A1 | 12/2008 | Sliwa | |
| 2009/0153659 A1 | 6/2009 | Landwehr et al. | |
| 2011/0260907 A1 | 10/2011 | Roche | |
| 2013/0155235 A1* | 6/2013 | Clough | G06K 9/0063 348/144 |

FOREIGN PATENT DOCUMENTS

| | | |
|---|---|---|
| CN | 102150653 A | 8/2011 |
| CN | 102870761 A | 1/2013 |
| JP | 2005-521975 A | 7/2005 |
| JP | 2007-034585 A | 2/2007 |
| JP | 2010-130327 A | 6/2010 |
| JP | 2010-193768 A | 9/2010 |
| JP | 2010-223752 A | 10/2010 |
| JP | 2011-095112 A | 5/2011 |
| JP | 2012-512352 A | 5/2012 |
| TW | M469748 U | 1/2014 |
| WO | WO-2009/102001 A1 | 8/2009 |

OTHER PUBLICATIONS

Written Opinion of the International Search Authority PCT/JP2015/063535 with English translation, 6 pages, dated Jul. 28, 2015.
Canadian Office Action issued in Canada Patent Application No. 2947138, dated Sep. 19, 2017, 4 pages.
Extended European Search Report issued in European Patent Application No. 15788738.1, dated Oct. 23, 2017, 9 pages.
Dezhen Song, et al. "A Low False Negative Filter for Detecing Rare Bird Species from Short Video Segments Using a Proable Observation Data Set-Based EKF Method", XP011328599, IEEE Transactions on Image Processing, vol. 19, No. 9, Sep. 1, 2010, pp. 2321-2331 (11 pages).
Zheng Qin, et al. "Extracting 2D Projection Contour from 3D Model Using Ring-Relationship-Based Method", XP055415043, Information Technology Journal, vol. 6, No. 6, Jun. 1, 2007, pp. 914-918 (6 pages).
Paul L. Rosin, et al. "Detecting and Classifying Intruders in Image Sequences", XP055413689, Jan. 1, 2991, pp. 293-300 (8 pages).
Mark Dunn, et al. "Machine Vision Classification of Animals", XP055413806, Future Trends Research Studies Press Ltd., Dec. 1, 2003, pp. 1-7 (8 pages).
Taiwan Office Action issued by the Taiwan Patent Office for Application No. 104114538 dated Apr. 28, 2017 (8 pages).
Korean Office Action issued by the Korean Intellectual Property Office for Korean Application No. 10-2016-7034216 dated Nov. 28, 2017 (9 pages).
Notification of First Office Action issued by the China National Intellectual Property Administration for Chinese Application No. 201580023777.2 dated Sep. 14, 2018 (25 pages).

* cited by examiner

OBJECT DETECTION DEVICE, OBJECT DETECTION METHOD, AND OBJECT DETECTION SYSTEM

CROSS-REFERENCE TO RELATED APPLICATIONS

This application is a national stage application of International Application No. PCT/JP2015/063535 entitled "OBJECT DETECTION DEVICE, OBJECT DETECTION METHOD, AND OBJECT DETECTION SYSTEM," filed on Apr. 30, 2015, which claims the benefit of the priority of Japanese Patent Application No. 2014-095815 filed on May 7, 2014, the disclosures of each of which are hereby incorporated by reference in their entirety.

TECHNICAL FIELD

This invention relates to an object detection device, an object detection method, and an object detection system.

BACKGROUND ART

In recent years, so-called "bird strike" has become a problem, in which a moving object, e.g., a bird, intrudes into a region where an airport, a wind power generation facility, or the like is constructed, and collides with an aircraft taking off from or landing at the airport, or with a windmill of the wind power generation facility.

Accordingly, there has been desired a detection device for detecting the intrusion of a bird into such region.

As a device for detecting a bird, there is known a device for imaging a flying object at minute time intervals, analyzing a flight pattern of the flying object from a brightness pattern distribution, making a database of the flight patterns, and detecting whether or not the flying object is a bird (Patent Document 1).

Moreover, there is also known a device for calculating 3D coordinates of a flying object based on a distance between the flying object and a camera and azimuth data, and detecting a bird from a flight trajectory (Patent Document 2).

Further, there is known a device for imaging a flying object and a fixed object in the same image, thereby acquiring the height of the flying object (Patent Document 3).

Still further, there is known a device for determining whether or not a flying object is a bird based on the speed of the flying object (Patent Document 4).

PRIOR ART DOCUMENTS

Patent Document

Patent Document 1: WO-A-2009/102001
Patent Document 2: JP-A-2011-95112
Patent Document 3: JP-A-2010-223752
Patent Document 4: JP-A-2010-193768

SUMMARY OF THE INVENTION

Problem to be Solved by the Invention

On this occasion, in terms of reducing damage to aircrafts and windmills caused by a bird strike, maintaining peripheries of the above-mentioned region so as to make the region an environment repelling birds, thereby reducing the frequency of appearance of birds themselves, results in a significant achievement and is thus important. On the other hand, the environment repelling birds depends greatly on the type of the bird, and it is thus very important to discriminate the type of the bird in the peripheries of the regions.

However, although the devices disclosed in Patent Documents 1 to 4 can determine whether or not the flying object is a bird, it is hard for those devices to accurately discriminate the type of the bird.

This invention has been made in view of the above-mentioned problem, and therefore has an object to provide an object detection device capable of accurately discriminating the type of a moving object.

Means to Solve the Problem

In order to solve the problem mentioned above, as a first aspect of the present invention, there is provided an object detection device, comprising: a primary determination unit for determining, from an image acquired by imaging a moving object, whether or not the moving object is a specific detection subject; and an object detection determination unit for estimating, based on a contour of the moving object determined to be the specific detection subject by the primary determination unit and contour shape information, which is a contour prepared for each of types of the specific detection subject, a type of the moving object out of the types of the specific detection subject.

As a second aspect of the present invention, there is provided a program for causing a computer to operate as an object detection device, the object detection device comprising: a primary determination unit for determining, from an image acquired by imaging a moving object, whether or not the moving object is a specific detection subject; and an object detection determination unit for estimating, based on a contour of the moving object determined to be the specific detection subject by the primary determination unit and contour shape information, which is a contour prepared for each of types of the specific detection subject, a type of the moving object out of the types of the specific detection subject.

As third aspect of the present invention, an object detection method, comprising: (a) imaging a moving object to acquire an image; (b) primarily determining, from the image, whether or not the moving object is a specific detection subject; and (c) estimating, based on a contour of the moving object determined to be the specific detection subject by the primary determination and contour shape information, which is a contour prepared for each of types of the specific detection subject, a type of the moving object out of the types of the specific detection subject.

As fourth aspect of the present invention, there is provided an object detection system, comprising: an image pickup device for imaging a moving object to acquire an image; a primary determination unit for determining, from the image, whether or not the moving object is a specific detection subject; and an object detection determination unit for estimating, based on a contour of the moving object determined to be the specific detection subject by the primary determination unit and contour shape information, which is a contour prepared for each of types of the specific detection subject, a type of the moving object out of the types of the specific detection subject.

Effect of the Invention

According to this invention, the object detection device capable of accurately discriminating the type of the moving object can be provided.

MODE FOR EMBODYING THE INVENTION

Now, a preferred embodiment of this invention is described in detail with reference to the drawings.

First, a configuration of an object detection system 1 including an object detection device 5 according to this embodiment is described with reference to FIG. 1 and FIG. 2.

In the following, a bird strike prevention device for estimating a type of bird from an image is described as an example of the object detection system 1 (object detection device 5).

Figure 1:
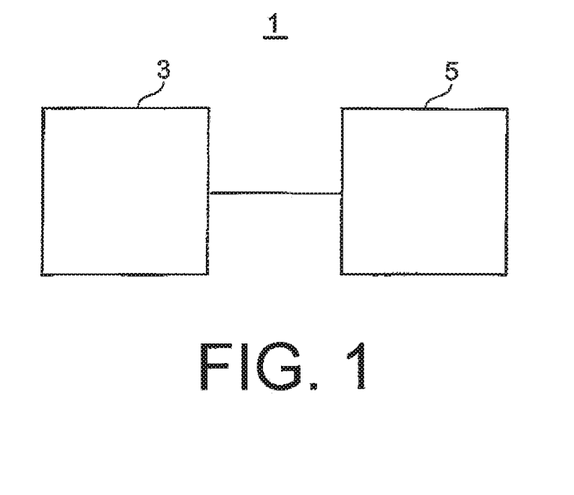
FIG. 1 is a block diagram for illustrating an outline of an object detection system 1 according to an embodiment of this invention.
Figure 2:
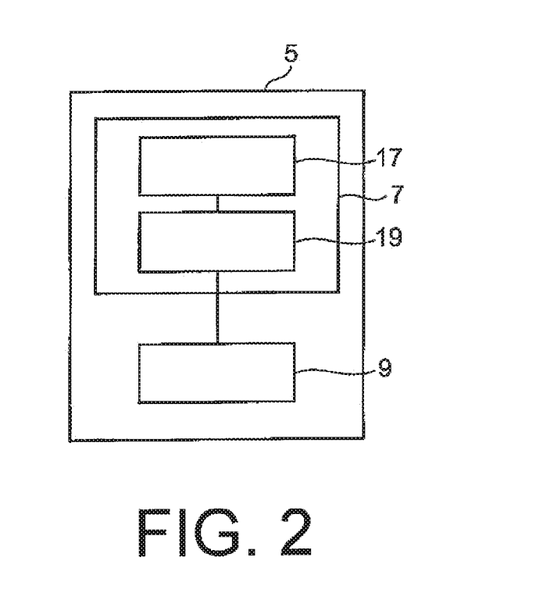
FIG. 2 is a block diagram for illustrating an object detection device 5 of FIG. 1.

As illustrated in FIG. 1 and FIG. 2, the object detection system 1 includes an image pickup device 3 for imaging a moving object to acquire an image. The object detection system 1 also includes an object detection device 5 including an object detection determination unit 7. The object detection determination unit 7 includes a bird candidate determination unit 17 serving as a primary determination unit for determining whether or not a moving object is a specific detection subject (a bird in this case) from the image acquired by imaging the moving object and a bird type/attitude estimation unit 19 for estimating, based on a contour of the moving object determined as a bird by the bird candidate determination unit 17, and a wireframe model library (hereinafter referred to as WFM library 9) storing contour shape information, which is a contour prepared for each of types of the specific detection subject (types of the bird in this case), the type of the moving object (the type of the bird in this case) out of the types of the specific detection subject.

In this case, the image pickup device 3 is a single monitoring camera. The surveillance camera is installed on a fixed base and is configured to take an image by carrying out fixed point monitoring at a constant azimuth or by carrying out turn monitoring all around or in a certain range through turning. Further, the image pickup device 3 transmits the taken image to the object detection device 5 in a wired or wireless manner.

According to this embodiment, the object detection device 5 is used in the bird strike prevention device, and hence the image pickup device 3 is installed at an end of a runway of an airport or in a facility of a wind power plant.

Moreover, according to this embodiment, the bird is detected as the specific detection subject, but types of birds and dogs and types of airplanes and helicopters are also exemplified as the specific detection subject.

Further, according to this embodiment, the bird type is estimated as the type out of the types of the specific detection subject. As used herein, the type out of the types of the specific detection subject refers to a type such as crow or pigeon when the specific detection subject is the bird.

The object detection device 5 is configured to extract an outer shape (contour in this case) of the moving object from the image taken by the image pickup device 3, and estimate the type of the bird from the extracted contour. Further, as described later, according to this embodiment, the object detection device 5 additionally has a function of estimating an attitude of the bird, a function of estimating a flight path from the type and the attitude of the bird, a function of finally determining whether or not the moving object is a bird from the flight path, and the type and the attitude of the bird, and a function of generating an alarm when likelihood of a bird strike exists.

An electronic computer, e.g., a personal computer, is used as the object detection device 5, but the object detection device 5 is not particularly limited to a specific device as long as the object detection device 5 is a device having a function of performing processing to be described later.

Figure 3:
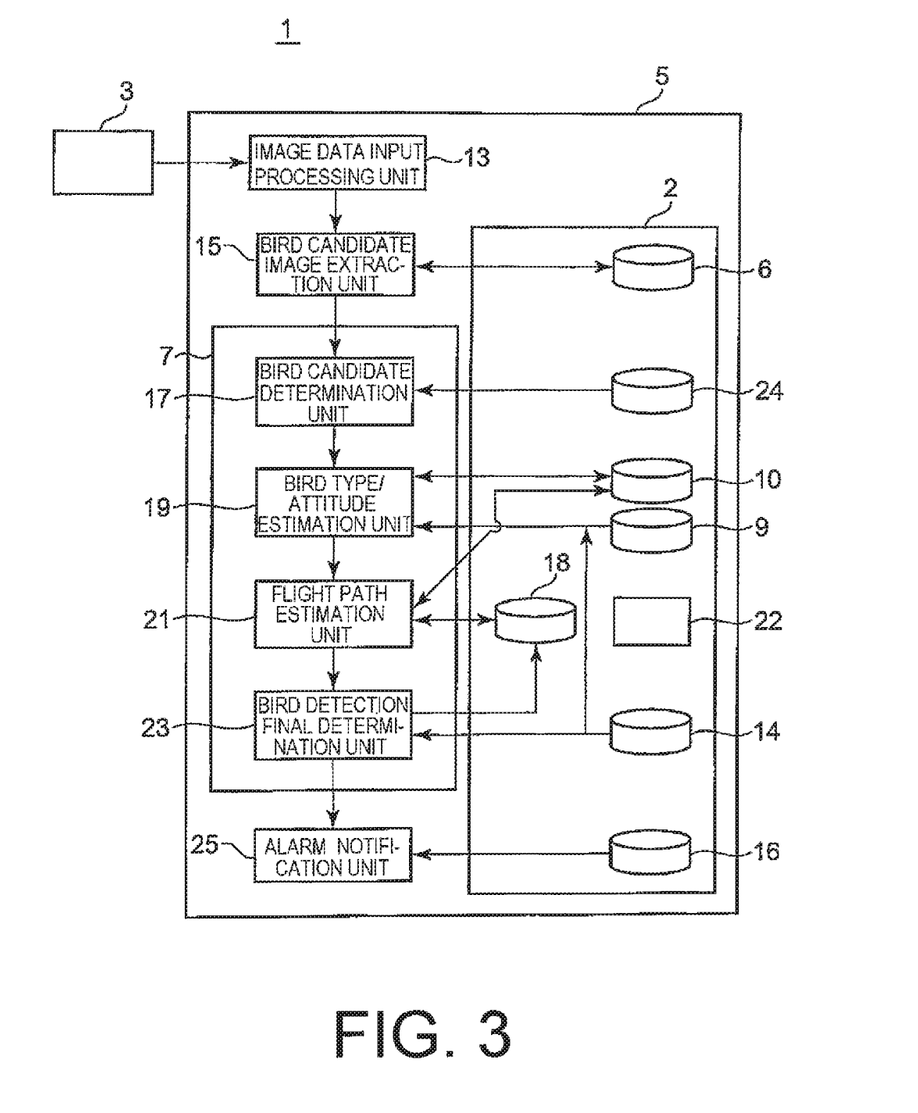
FIG. 3 is a block diagram for illustrating details of the object detection system 1.

Referring to FIG. 3, a detailed description is now given of a configuration of the object detection system 1, in particular, a configuration of the object detection device 5.

As illustrated in FIG. 3, the object detection device 5 includes an image data input processing unit 13 for inputting data of the image taken by the image pickup device 3, a bird candidate image extraction unit 15 for extracting a contour line of a moving object from the image to generate moving object information 6, the object detection determination unit 7 for estimating absence/presence, type, and attitude of the bird based on the moving object information 6 extracted by the bird candidate image extraction unit 15, an alarm notification unit 25 for generating an alarm when the bird is likely to intrude into a prioritized monitoring region based on the detection result of the object detection determination unit 7, and a storage unit 2 for storing an operation program 22 for operating the object detection device 5, and various types of information and libraries described later.

The object detection determination unit 7 includes the bird candidate determination unit 17 for carrying out, from the moving object information 6, a primary determination regarding whether or not the moving object is a bird, the bird type/attitude estimation unit 19 for estimating the type and the attitude of the bird from the moving object information 6, a flight path estimation unit 21 for estimating a flight path of each of bird candidates (moving objects), and a bird detection final determination unit 23 for finally determining whether or not each of the bird candidates (moving objects) is to be recognized as a bird.

In more detail, the image data input processing unit 13 is configured to receive the taken image transmitted from the image pickup device 3, and always record image data corresponding to three frames in a first-in first-out manner in an internal temporary recording memory. Image disturbance caused by a rolling shutter phenomenon and an operation error of a camera platform of the image temporarily stored in the image data input processing unit 13 is corrected, and the image is then sequentially output to the bird candidate image extraction unit 15.

The bird candidate image extraction unit 15 is configured to extract the contour line of the moving object from differential information on the image of three successive frames. Moreover, information, which is a combination of an imaging time and a relative azimuth of the moving object with respect to the camera, brightness information at coordinates of the entire object on the image, and a histogram-of-oriented-gradients (HOG) characteristic amount, is stored as moving object information 6 in the storage unit 2.

The bird candidate determination unit 17 is configured to refer to a bird discrimination library 24 of the storage unit 2 based on the HOG characteristic amount of the moving object information 6, thereby making a determination (primary determination) regarding whether or not the moving object is a bird with a binary discriminator that is based on the principle of support vector machine (SVM), a neural network, or the like.

The bird discrimination library 24 is a database for generating a discrimination criterion for the binary discriminator. When the SVM is employed, the bird discrimination library 24 is constructed by image information on the bird and image information on objects other than the bird as comparison subjects.

The bird type/attitude estimation unit 19 is configured to successively compare the contour information on the bird selected from the WFM library 9 provided in the storage unit 2 and the moving object information 6 with each other, thereby extracting the type and the attitude of the bird highest in similarity (secondary determination). Moreover, the bird type/attitude estimation unit 19 is configured to store in the storage unit 2 information acquired by adding the estimated bird type, attitude, and a distance or position information on a map from the image pickup device for the bird to the moving object information 6 as bird candidate information 10.

The WFM library 9 holds information on a standard body shape and a wing flap simulated as a wireframe model for each of bird types observed in a periphery of a prioritized monitoring region. Moreover, the WFM library 9 holds plane projection contour shape information in cases where rotational angles about three axes and a wing flap angle are each changed at certain ratios for each of the birds.

According to this embodiment, the wireframe model is used to generate the plane projection contour shape information in this way. This is for the following reasons.
(1) At least thousands of examples of image information are necessary for generating the plane projection contour shape information from images of birds prepared in advance.
(2) When the information (i.e., reference model) simulating the standard body shape and wing flap is generated as the wireframe model, the model for each of the bird types can be relatively easily generated from a result of measuring skeletal specimens and images of characteristic attitudes and partial shapes of the corresponding bird type. In addition, a contour after a change in the attitude about the three axes can be generated in a short period compared with a case where the plane projection contour shape information is generated from images of birds prepared in advance.

The flight path estimation unit 21 is configured to estimate a flight path of an individual bird from the bird candidate information 10, and successively store the flight path as flight path tracking information 18 in the storage unit 2.

The bird detection final determination unit 23 is configured to compare the flight path tracking information 18 and characteristic information of each of the birds recorded in a bird type characteristic library 14 in the storage unit 2 with each other, thereby finally determining whether or not each of the bird candidates is to be recognized as the bird.

The bird type characteristic library 14 is a library for recording an appearance prior probability for each of the bird types observed in the periphery of the facility when standard body length, mass, flight speed, wing flap frequency, and month and time zones are considered as criteria.

The alarm notification unit 25 is configured to evaluate danger of the intrusion of the bird into the region of the facility specified by prioritized monitoring region information 16 stored in the storage unit 2 for each of the bird candidates (moving objects) based on the flight path tracking information 18, and generate an alarm when danger higher than a certain level exists, that is, when a bird strike is likely to occur.

The prioritized monitoring region information 16 is information defining regions where an intrusion of the bird needs to be monitored in a facility, and information on regions where, for example, an airport or a wind power generation facility exists.

In FIG. 3, the moving object information 6, the bird discrimination library 24, the WFM library 9, the bird candidate information 10, the flight path tracking information 18, the bird type characteristic library 14, the prioritized monitoring region information 16, and the operation program 22 are stored in the storage unit 2 provided in the object detection device 5, but may be replaced by an external storage device or external information connected via a network, e.g., the World Wide Web (WWW).

Next, an operation of the object detection system 1, which is an operation for preventing a bird strike in this case, is described with reference to FIG. 4 to FIG. 6.

First, the operation program 22 of the object detection device 5 is started.

Then, the image pickup device 3 carries out fixed point monitoring at a constant azimuth, or turn monitoring all around or in a certain range through turning, thereby taking images in the prioritized monitoring region defined by the prioritized monitoring region information 16 or the periphery thereof. The monitoring device 3 continuously transmits the taken image, for example, at 60 frames per second to the image data input processing unit 13 of the object detection device 5, and the image data input processing unit 13 receives the image (S1 of FIG. 4). When the prioritized monitoring region is an airport, the image pickup device 3 acquires an image in each of directions including a direction of a runway, thereby taking images of the airport and a periphery of the airport.

The image data input processing unit 13 corrects the disturbance of the image caused by the rolling shutter phenomenon and the operation error of the camera platform of the received image, and then sequentially outputs the corrected image to the bird candidate image extraction unit 15.

The bird candidate image extraction unit 15 binarizes, in terms of the brightness, three images (respectively referred to as frames n−1, n, and n+1) extracted successively or at a constant interval in a time series from the received images, and then respectively generates differential images m=n−(n−1) and m+1=(n+1)−n. Further, a moving object, which is a bird candidate, is extracted from the three original images by generating an AND image D=m*(m+1) of m and m+1. A position of the center of gravity, a shape, and a size on D of the moving object extracted on D are normalized with respect to reference values set in advance, and the HOG characteristic amount is calculated. Then, the "moving object information 6" is generated by adding the imaging time and the optical axis azimuth of the image pickup device at the imaging time to the HOG characteristic amount, and the moving object information 6 is stored in the storage unit 2 (S2 of FIG. 4).

Figure 4:
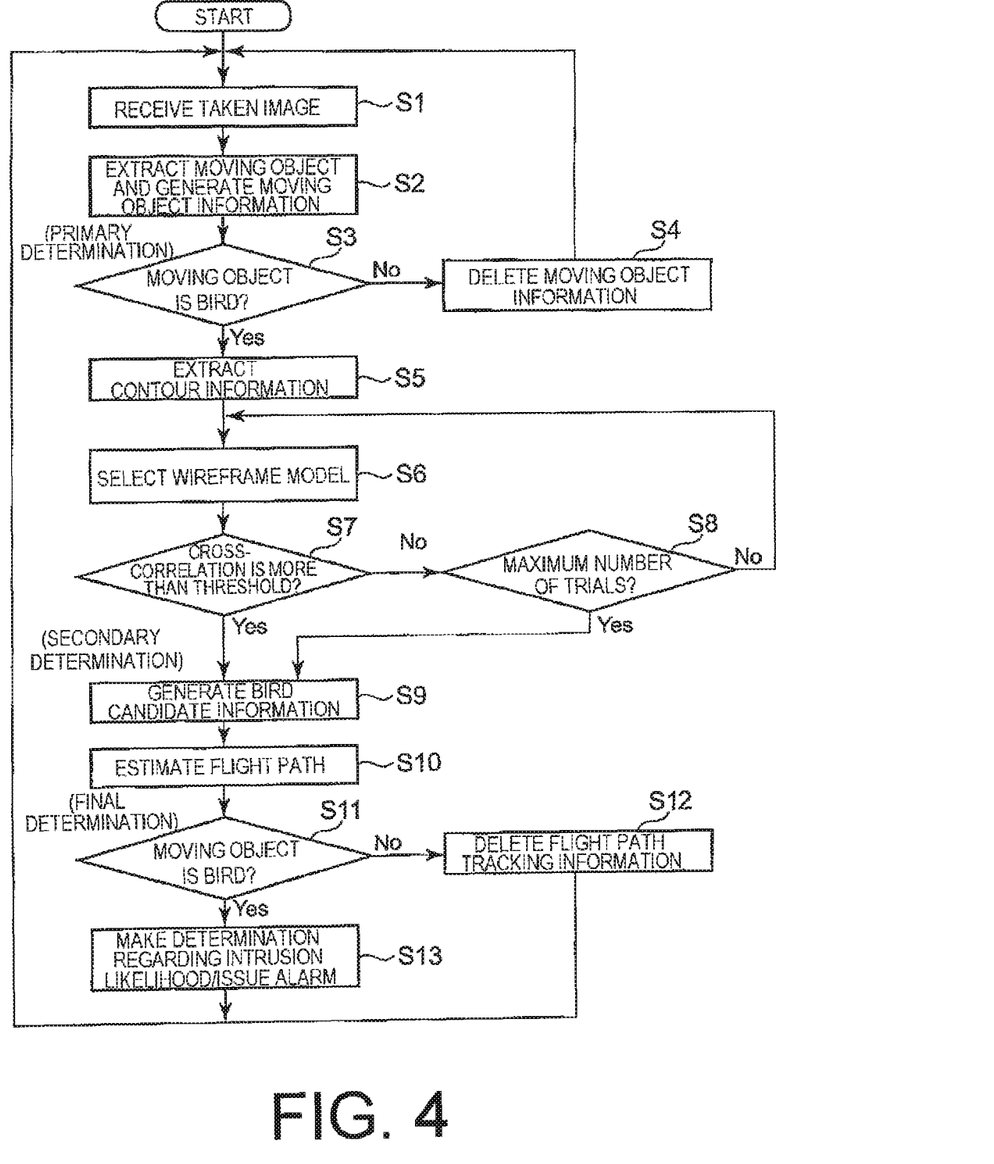
FIG. 4 is a flowchart for illustrating a method of detecting a bird, and estimating a bird type/a flying attitude using the object detection system 1.

The bird candidate determination unit 17 applies binary discrimination to each piece of the moving object information 6 by using a threshold generated from the database of the bird discrimination library 24 as a reference based on the HOG characteristic amount of the moving object information 6, thereby carrying out the primary determination regarding whether or not the bird candidate (moving object) is a bird (S3 of FIG. 4).

When the moving object is determined as an object other than the bird through the primary determination, the moving object information 6 on this moving object is deleted, and the operation returns to Step S1 (S4 of FIG. 4).

For a moving object determined as a bird by the primary determination, the bird candidate image extraction unit 15 carries out normalization of increasing or decreasing the shape information of the moving object information 6 to a size set in advance, 100×100 px, thereby extracting the contour information (S5 of FIG. 4).

Then, the bird type/attitude estimation unit 19 selects one sample image out of contour images of the birds projected on the two-dimensional plane through the wireframe model in the WFM library 9 stored in the storage unit 2 (S6 of FIG. 4).

The sample image is an image acquired by changing respective angles by approximately 10° to 20° as parameters, which are the bird type, the three-axis attitude and the wing flap angle. Sample data is prepared for ten types of birds while the three axes and the wing flap angle are changed by the increment of 10°.

Then, the bird type/attitude estimation unit 19 calculates a cross-correlation from the selected sample image and the normalized bird candidate image contour, and determines whether or not the result is more than a threshold set for each of the bird types (S7 of FIG. 4).

When the result is more than the threshold, the comparison is finished in this state, and the bird type, the attitude, and the wing flap angle of the bird candidate (moving object) are estimated to be values of the sample image. In other words, the moving object is estimated to be the corresponding bird type. When the result is less than the threshold, a new sample is selected, and the same comparison is repeated. On this occasion, the bird type/attitude estimation unit 19 determines whether or not a predetermined maximum number of trials is reached (S8 of FIG. 4). When a correlation equal to or more than the threshold is not found after the maximum number of trials, the comparison is finished, and the moving object is estimated to be the sample presenting the maximum correlation out of all the trials.

In this way, the object detection system 1 is configured to analyze the contour of a bird to estimate the type of the bird, and can thus more accurately estimate the type of the bird compared with related-art analysis of using parameters, e.g., a flight pattern, a flight trajectory, a flight height, and a flight speed, which are hard to use to directly estimate the bird type.

In other words, the object detection system 1 is configured to be able to define the discrimination of the bird type based on the single scale, which is the conformity with the two-dimensional contour shape sample having the bird type, the attitude, and the wing flap angle as the parameters, thereby uniformly defining the likelihood relating to the discrimination of the bird type, and be able to discriminate the type more accurately than a related-art device.

Incidentally, the above-mentioned processing is a search problem in five dimensions, which is the bird type, the three-axis attitude, and the wing flap angle, and a difference between the samples in the WFM library 9 presents a so-called "sandstorm" distribution in the selection of the sample image, and is therefore differentiable nowhere, and a next candidate cannot be predicted through the Newton-Raphson method or the like. Therefore, an exhaustive search is generally necessary to acquire the optimal solution. However, as described above, the number of samples to be compared reaches approximately 8 million, and execution of the exhaustive search takes a very long time.

Thus, according to this embodiment, the bird type/attitude estimation unit 19 employs general characteristics relating to the image pickup device 3 and ecology of the bird as prior information, and compares the sample, in descending order of the probability of the correlation with the bird candidate image, with the bird candidate image, thereby attempting to find the optimal sample after a relatively small number of iterations of the calculation.

According to this embodiment, the following four items are employed as the prior information.

Prior information (1): The bird does not often fly at a large angle (more than approximately ±20°) in the pitch direction.

Prior information (2): The body shape of the bird is left-right symmetrical, and the number of factors for changing the outer shape other than the wing flap is small.

Prior information (3): The types of the bird to be detected are limited depending on the season and the time.

Prior information (4): The angle of the field of the image pickup device 3 is usually approximately ±20° at the maximum.

When the above-mentioned four items of the prior information are employed, the following items can be assumed at a relatively high probability for the attitude of the bird candidate (moving object).

(i) The bird apparently flies with an attitude close to a pitch angle of 0° and a roll angle of 0°.

(ii) When a median in the vertical direction is close to a center of gravity value, the wing flap angle is around 90°.

(iii) The bird types to be examined can be prioritized depending on the season and the time.

Based on the assumptions (i) to (iii), a sample search is carried out in the following sequence.

S101: The bird type/attitude estimation unit 19 sets initial values of the five types of parameters as (bird type=type having highest appearance prior probability for the season/time, each of the 3 axes=0°, and the wing flap angle=90°), and compares the initial values with the contour of the bird candidate (moving object).

S102: The bird type/attitude estimation unit 19 sequentially changes one of the respective parameters at a time to select a sample. In this configuration example, a sample changed in the wing flap angle by 20° from the sample in Step S101 is used as a second sample for the comparison with the bird candidate (moving object). After all the variations in the wing flap angle are confirmed, samples where the angle is sequentially changed in the yaw axis, the roll axis, and the pitch axis are used. Subsequently, Steps S102 and S103 are sequentially repeated in descending order of the appearance frequency of the bird type.

Figure 6:
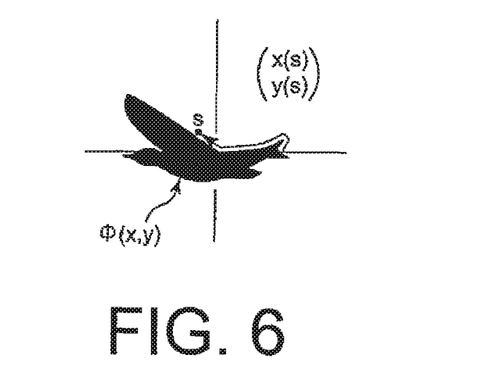
FIG. 6 is a diagram for illustrating a method of reducing the dimensions of outer shape information on the bird from two dimensions to one dimension.

Incidentally, the comparison in the cross-correlation handles two-dimensional shapes of the bird candidate image and the sample image as illustrated in FIG. 6, and thus results in a relatively large calculation amount. Thus, the simplification and the increase in the speed of this calculation are very important for realizing real time performance of the device and a reduction in the cost of the device.

A cross-correlation C of the binarized image of FIG. 6 can be represented as Equation (1) as an example where a function representing the two-dimensional shape of the bird candidate or the sample image is denoted by φ and the average of φ is denoted by ξ.

$$C = (\int(\varphi 1 - \zeta 1) \cdot (\varphi 2 - \zeta 2) dA) / (\int(\varphi 1 - \zeta 1)^2 dA \cdot \int(\varphi 2 - \zeta 2)^2 dA)^{1/2} \quad (1)$$

Figure 7:
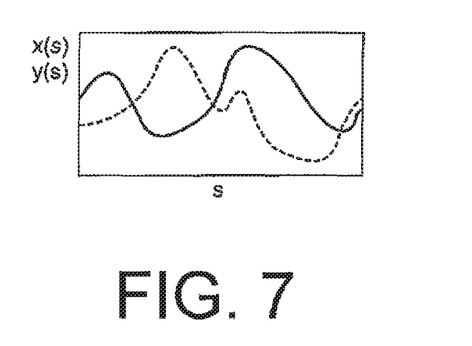
FIG. 7 is a diagram for illustrating the method of reducing the dimensions of the outer shape information on the bird from two dimensions to one dimension.

On the other hand, according to this embodiment, the function φ representing the two dimensional shape and ξ are converted to vectors Φ and Ξ having a distance s from a reference point on the contour line as a parameter, and the cross-correlation between the bird candidate (moving object) and the sample is changed to C so as to be treated as a cross-correlation V of vectors represented as Equation (3) as an example, thereby, as illustrated in FIG. 7, decreasing the number of dimensions of the outer shape information on the bird from two to one to decrease a calculation amount.

$$\varphi = \{x(s), y(s)\}, \Xi = \{\varepsilon\{x(s)\}, \varepsilon\{y(s)\}\} \quad (2)$$

$$V = (\int(\varphi 1 - \Xi 1) \cdot (\varphi 2 - \Xi 2) ds) / (\int(\varphi 1 - \Xi 1)^2 ds \cdot \int |\varphi 2 - \Xi 2|^2 ds)^{1/2} \quad (3)$$

The bird type/attitude estimation unit 19 adds the bird type, the three-axis attitude, and the wing flap angle to the moving object information 6 for the bird candidate (moving object) for which those pieces of information are estimated through evaluation by using the cross-correlation V, thereby generating "bird candidate information 10", and stores the bird candidate information 10 in the storage unit 2 (S9 of FIG. 4).

Then, the flight path estimation unit 21 estimates the flight path of the bird candidate (moving object) through the following procedure, and newly generates or updates the flight path tracking information 18 (S10 of FIG. 4).

First, the flight path estimation unit 21 estimates the actual body length of the bird from the bird type estimated by the bird type/attitude estimation unit 19. Then, the body length on the image of the bird candidate is calculated based on the attitude estimation value, and the distance from the image pickup device 3 to the bird is also calculated through a simple proportion based on the body length estimation value, the size on the image, and the focal length of the image pickup device 3. The installation position of the image pickup device 3 and the orientation azimuth upon the imaging are known, and thus the position of the bird on the map is calculated based on the installation position and the orientation azimuth.

Then, the flight path estimation unit 21 compares the calculated type and position on the map of the bird candidate (moving object) with the flight path tracking information 18 before the current time point, thereby associating the bird candidate information 10 with the flight path tracking information 18. When information which can be associated with the flight path tracking information 18 does not exist, information is newly added.

Then, as the final determination, the bird detection final determination unit 23 compares the flight path tracking information 18 with the ecology characteristic unique to the bird type recorded in the bird type characteristic library 14 (S11 of FIG. 4), and excludes a bird candidate (moving object) that apparently poses a problem as a bird (S12 of FIG. 4).

Figure 5:
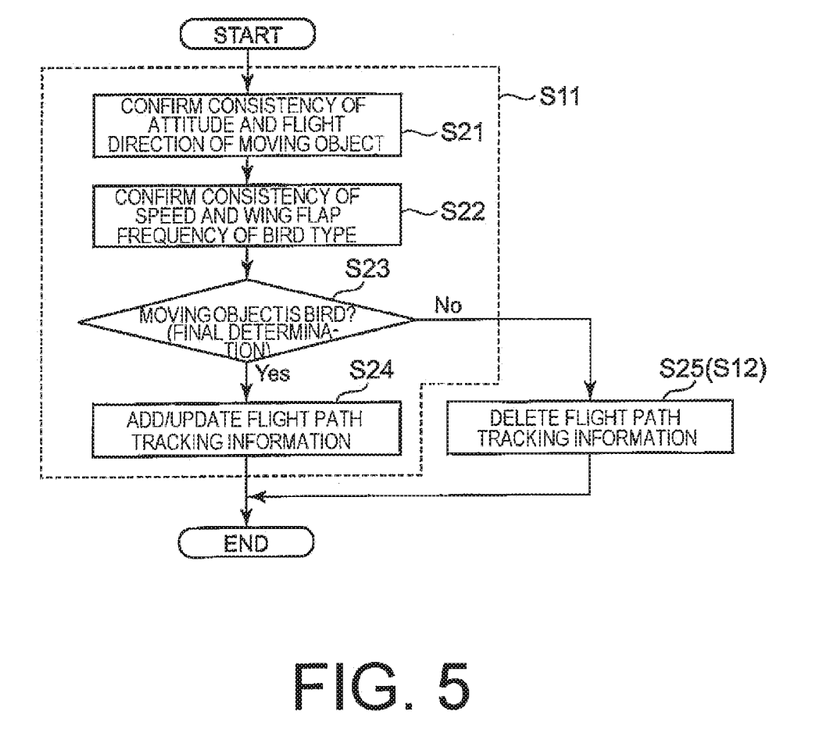
FIG. 5 is a flowchart for illustrating in detail Steps S11 and S12 of FIG. 4.

Specifically, the bird detection final determination unit 23 confirms consistency between the attitude and a flight direction of the moving object (S21 of FIG. 5).

In other words, the bird detection final determination unit 23 confirms whether or not the moving object primarily determined as a bird is flying toward a direction which is usually an improbable direction, e.g., a rear direction or a back direction.

Then, the bird detection final determination unit 23 confirms whether or not the moving object primarily determined as a bird presents a motion deviating from ranges of the flight speed and the wing flap frequency unique to the bird type (S22 of FIG. 5).

The bird detection final determination unit 23 finally determines, based on those confirmations and from information acquired by observing the attitude and the wing flap of each of the birds in a time series, whether or not the moving object is a bird (S23 of FIG. 5).

When the moving object is determined to be a bird as a result of the final determination, the flight path tracking information 18 on this moving object is added or updated (S24 of FIG. 5). When the moving object is determined not to be a bird, the flight path tracking information 18 on this moving object is deleted (S25 of FIG. 5 and S12 of FIG. 4).

In this way, in the object detection system 1, the bird detection final determination unit 23 is configured to discriminate whether or not a moving object is a bird based on not only the shape information but also the characteristics of each bird type, e.g., the flight attitude, the flight speed, and the wing flap frequency.

Therefore, whether or not a moving object is a bird can be discriminated more accurately.

Finally, the alarm notification unit 25 compares the flight path tracking information 18 and the prioritized monitoring region information 16 with each other, thereby determining whether or not the bird is likely to intrude into the prioritized monitoring region. When the bird is determined to likely to intrude into the region, the alarm notification unit 25 issues the alarm to a system or a person in charge of surveillance that monitors the prioritized monitoring region (S13 of FIG. 4).

What is specifically issued as the alarm is not particularly limited as long as the alarm allows the system or person in charge of surveillance to be warned to recognize the alarm, and examples thereof include transmission of alarm information to the system or the person in charge of surveillance and emission of a physical sound, light, or the like. Moreover, the flight trajectory of a bird may always be displayed on a display or the like in place of the alarm.

A description has been given of the operation of the object detection system 1.

According to this embodiment, the object detection system 1 includes the image pickup device 3 for imaging a moving object to acquire an image, and the object detection device 5 including the object detection determination unit 7. The object detection determination unit 7 includes the bird candidate determination unit 17 for determining, from the image acquired by imaging the moving object, whether or not the moving object is a bird, and the bird type/attitude estimation unit 19 for estimating the bird type of the moving object based on the contour of the moving object determined as a bird by the bird candidate determination unit 17 and the WFM library 9 storing contour shape information, which is the contour prepared for each of the types of the bird.

Therefore, the object detection system 1 can accurately discriminate the type of the moving object.

INDUSTRIAL APPLICABILITY

In the above, this invention is described by way of the embodiment and Example, but the embodiment and Example are merely ones used to describe the invention by giving an example, and are not intended to limit the scope of this invention thereto. It should be understood that a person skilled in the art could arrive at various modification examples and improvement examples based on the above description, and that those modification examples and improvement examples are included in the scope of this invention.

For example, in the embodiment described above, the case is described where this invention is applied to the bird strike prevention device at an airport or a wind power generation facility (windmill), but this invention is by no means limited to this case. This invention is applicable to any device required to surveil flying and arrival of birds, e.g., a device for preventing feeding damage at a farm caused by birds or animals.

Moreover, according to the embodiment, the bird type is estimated from the outer shape of the moving object, but the application subject of this embodiment is not limited to the estimation of the bird type, and the detection subject can be any animal other than the bird, e.g., a human or a mammal, or an arbitrary object set by the user as long as the type of the moving object can be identified from the outer shape.

Further, according to the embodiment, the object detection system 1 includes one image pickup device 3 and one object detection device 5, but the number of the image pickup devices 3 and the number of the object detection devices 5 are not limited to one, and a plurality of each of those devices may be simultaneously connected. In this case, the pieces of output image information of the respective image pickup devices 3 are output in parallel to all the object detection devices 5, and the object detection device 5 can select one of the image pickup devices 3 whose input is to be processed through an operation of the user.

Each of the units of the object detection device 5 may be implemented with the use of a combination of hardware and software. In a mode where hardware and software are used in combination, a program for causing a computer to operate as the object detection device 5 is deployed onto a RAM, and a hardware component, e.g., a control unit (CPU), is operated based on the program, to thereby cause respective units to operate as various types of components. Further, the program may be recorded onto a recording medium to be distributed. The program recorded onto the recording medium is read into a memory in a wireless or wired manner or via the recording medium itself to cause the control unit or the like to operate. Examples of the recording medium include an optical disc, a magnetic disk, a semiconductor memory device, and a hard disk.

REFERENCE SIGNS LIST 1 object detection system
2 storage unit
3 image pickup device
5 object detection device
6 moving object information
7 object detection determination unit
9 WFM library
10 bird candidate information
13 image data input processing unit
14 bird type characteristic library
15 bird candidate image extraction unit
16 prioritized monitoring region information
17 bird candidate determination unit
18 flight path tracking information
19 bird type/attitude estimation unit
21 flight path estimation unit
22 operation program
23 bird detection final determination unit
24 bird discrimination library
25 alarm notification unit This application claims the priority based on Japanese Patent Application No. 2014-095815, filed on May 7, 2014, the entire disclosure of which is incorporated herein by reference.

The invention claimed is:

1. An object detection device, comprising:
a primary determination unit comprising processing circuitry configured to determine, from an image acquired by imaging a moving object, whether or not the moving object is a specific detection subject;
an object detection determination unit comprising processing circuitry configured to estimate, based on a contour of the moving object determined to be the specific detection subject by the primary determination unit and contour shape information, which is a contour prepared for each of types of the specific detection subject, a type of the moving object out of the types of the specific detection subject;
the specific detection subject comprises a bird;
the object detection device further comprises a bird image candidate extraction unit comprising processing circuitry configured to extract a contour of the bird from the image;
the object detection determination unit comprises a bird detection determination unit comprising processing circuitry configured to estimate a type of the bird from the contour;
the bird image candidate extraction unit is configured to store information including a contour line of the bird extracted from the image as moving object information; and
the bird detection determination unit comprises:
a wireframe model library storing information on a wireframe of simulating a standard body shape and a wing flap for each of the types of the bird and plane projection contour shape information when rotational angles about three axes and a wing flap angle are each changed at certain rates for each of the types of the bird; and
a bird type/attitude estimation unit comprising processing circuitry configured to compare the moving object information with the wireframe model library to estimate the type and an attitude of the bird.

2. An object detection device according to claim 1, wherein:
the moving object information and the plane projection contour shape information include a vector having a distance from a reference point to the contour as a parameter; and
the bird detection determination unit is configured to estimate the moving object as a corresponding bird type when a cross-correlation of the vector is more than a threshold set for each of the bird types.

3. An object detection device according to claim 1, wherein the bird type/attitude estimation unit is configured to employ, when the moving object information and the wireframe model library are compared with each other, general features relating to an image pickup device for imaging the moving object and the moving object as prior information, and to compare, based on the prior information, the plane projection contour shape information with the moving object information in descending order of a probability of correlation with the contour of the moving object, to thereby estimate the type of the bird.

4. An object detection device according to claim 1, further comprising a flight path estimation unit comprising processing circuitry configured to estimate a flight path of the bird from the type and the attitude of the bird estimated by the bird type/attitude estimation unit.

5. An object detection device according to claim 4, further comprising a bird detection final determination unit comprising processing circuitry configured to confirm, from the type and the attitude of the bird estimated by the bird type/attitude estimation unit and the flight path estimated by the flight path estimation unit, consistency of the attitude and a flight direction of the moving object, and consistency of a flight speed and a wing flap frequency unique to the bird type, to thereby finally determine whether or not the moving object is a bird.

6. An object detection device according to claim 4, further comprising an alarm notification unit comprising processing circuitry configured to determine, from the flight path, whether or not likelihood that the bird intrudes into a region set in advance exists, and generating an alarm when the likelihood exists.

7. A program stored on a non-transitory computer-readable medium for causing a computer to operate as an object detection device, the object detection device comprising:
a primary determination unit comprising processing circuitry configured to determine, from an image acquired by imaging a moving object, whether or not the moving object is a specific detection subject;
an object detection determination unit comprising processing circuitry configured to estimate, based on a contour of the moving object determined to be the specific detection subject by the primary determination unit and contour shape information, which is a contour prepared for each of types of the specific detection subject, a type of the moving object out of the types of the specific detection subject;
the specific detection subject comprises a bird;
the object detection device further comprises a bird image candidate extraction unit comprising processing circuitry configured to extract a contour of the bird from the image;
the object detection determination unit comprises a bird detection determination unit comprising processing circuitry configured to estimate a type of the bird from the contour;
the bird image candidate extraction unit is configured to store information including a contour line of the bird extracted from the image as moving object information; and
the bird detection determination unit comprises:
a wireframe model library storing information on a wireframe of simulating a standard body shape and a wing flap for each of the types of the bird and plane projection contour shape information when rotational angles about three axes and a wing flap angle are each changed at certain rates for each of the types of the bird; and
a bird type/attitude estimation unit comprising processing circuitry configured to compare the moving object information with the wireframe model library to estimate the type and an attitude of the bird.

8. An object detection method, comprising:
(a) imaging a moving object to acquire an image;
(b) primarily determining, from the image, whether or not the moving object is a specific detection subject;
(c) estimating, based on a contour of the moving object determined to be the specific detection subject by the primary determination and contour shape information, which is a contour prepared for each of types of the specific detection subject, a type of the moving object out of the types of the specific detection subject, wherein the specific detection object comprises a bird
(d) extracting a contour of the bird from the image;
(e) estimating a type of the bird from the contour;
(f) storing information including a contour line of the bird extracted from the image as moving object information;
(g) storing information on a wireframe of simulating a standard body shape and sing flap for each of the types of the bird and plane projection contour shape information when rotational angles about three axes and a wing flap angle are each changed at certain rates for each of the types of the bird; and
(h) comparing the moving object information with the wireframe model library to estimate the type and an attitude of the bird.

9. An object detection system, comprising:
an image pickup device for imaging a moving object to acquire an image;
a primary determination unit comprising processing circuitry configured to determine determining, from the image, whether or not the moving object is a specific detection subject; and
an object detection determination unit comprising processing circuitry configured to estimate, based on a contour of the moving object determined to be the specific detection subject by the primary determination unit and contour shape information, which is a contour prepared for each of types of the specific detection subject, a type of the moving object out of the types of the specific detection subject;
the specific detection subject comprises a bird;
the object detection device further comprises a bird image candidate extraction unit comprising processing circuitry configured to extract a contour of the bird from the image;
the object detection determination unit comprises a bird detection determination unit comprising processing circuitry configured to estimate a type of the bird from the contour;
the bird image candidate extraction unit is configured to store information including a contour line of the bird extracted from the image as moving object information; and
the bird detection determination unit comprises:
a wireframe model library storing information on a wireframe of simulating a standard body shape and a wing flap for each of the types of the bird and plane projection contour shape information when rotational angles about three axes and a wing flap angle are each changed at certain rates for each of the types of the bird; and
a bird type/attitude estimation unit comprising processing circuitry configured to compare the moving object information with the wireframe model library to estimate the type and an attitude of the bird.

10. An object detection system according to claim 9, wherein the image pickup device comprises a single monitoring camera.

* * * * *

UNITED STATES PATENT AND TRADEMARK OFFICE
CERTIFICATE OF CORRECTION

| | |
|---|---|
| PATENT NO. | : 10,157,468 B2 |
| APPLICATION NO. | : 15/308753 |
| DATED | : December 18, 2018 |
| INVENTOR(S) | : Kumeno et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 61 days.

Signed and Sealed this
Twenty-fourth Day of December, 2019

Andrei Iancu
*Director of the United States Patent and Trademark Office*